United States Patent
Su et al.

(10) Patent No.: US 9,066,070 B2
(45) Date of Patent: Jun. 23, 2015

(54) NON-LINEAR VDR RESIDUAL QUANTIZER

(75) Inventors: Guan-Ming Su, Fremont, CA (US); Yufei Yuan, Austin, TX (US); Sheng Qu, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/113,939

(22) PCT Filed: Apr. 24, 2012

(86) PCT No.: PCT/US2012/034747
§ 371 (c)(1), (2), (4) Date: Oct. 25, 2013

(87) PCT Pub. No.: WO2012/148883
PCT Pub. Date: Nov. 1, 2012

(65) Prior Publication Data
US 2014/0050271 A1 Feb. 20, 2014

Related U.S. Application Data

(60) Provisional application No. 61/478,836, filed on Apr. 25, 2011.

(51) Int. Cl.
*H04N 7/26* (2006.01)
*H04N 7/12* (2006.01)
*H04N 7/32* (2006.01)
(Continued)

(52) U.S. Cl.
CPC ...... *H04N 19/00096* (2013.01); *H04N 7/26941* (2013.01); *H04N 7/50* (2013.01); *H04N 21/2365* (2013.01); *H04N 19/46* (2014.11); *H04N 19/126* (2014.11); *H04N 19/136* (2014.11);

(Continued)

(58) Field of Classification Search
USPC .................................................. 375/240.26
See application file for complete search history.

(56) References Cited

U.S. PATENT DOCUMENTS

| 4,811,396 A | 3/1989 | Yatsuzuka |
| 7,272,556 B1 | 9/2007 | Aguilar |

(Continued)

FOREIGN PATENT DOCUMENTS

| WO | 99/16050 | 4/1999 |
| WO | 2010/043922 | 4/2010 |

(Continued)

OTHER PUBLICATIONS

Segall, A., "Scalable Coding of High Dynamic Range Video," IEEE International Conference on Image Processing, ICIP, 2007.

(Continued)

*Primary Examiner* — Jessica M Prince
*Assistant Examiner* — On S Mung

(57) ABSTRACT

In layered VDR coding, inter-layer residuals are quantized by a non-linear quantizer before being coded by a subsequent encoder. Several non-linear quantizers are presented. Such non-linear quantizers may be based on sigmoid-like transfer functions, controlled by one or more free parameters that control their mid-range slope. These functions may also depend on an offset, an output range parameter, and the maximum absolute value of the input data. The quantizer parameters can time-vary and are signaled to a layered decoder. Example non-linear quantizers described herein may be based on the mu-law function, a sigmoid function, and/or a Laplacian distribution.

10 Claims, 4 Drawing Sheets

(51) Int. Cl.

| | | |
|---|---|---|
| *H04N 11/02* | (2006.01) | |
| *H04N 19/126* | (2014.01) | |
| *H04N 19/46* | (2014.01) | |
| *H04N 19/136* | (2014.01) | |
| *H04N 19/186* | (2014.01) | |
| *H04N 19/192* | (2014.01) | |
| *H04N 19/86* | (2014.01) | |
| *H04N 19/36* | (2014.01) | |
| *H04N 19/40* | (2014.01) | |
| *H04N 19/61* | (2014.01) | |
| *H04N 21/2365* | (2011.01) | |

(52) U.S. Cl.
CPC ........... *H04N19/186* (2014.11); *H04N 19/192* (2014.11); *H04N 19/86* (2014.11); *H04N 19/36* (2014.11)

(56) References Cited

U.S. PATENT DOCUMENTS

| | | | |
|---|---|---|---|
| 7,277,484 B2 | 10/2007 | Kim | |
| 7,450,643 B2 | 11/2008 | Chujoh | |
| 7,760,949 B2 | 7/2010 | Segall | |
| 8,218,625 B2 | 7/2012 | Ward | |
| 8,537,893 B2 | 9/2013 | Efremov | |
| 2005/0259729 A1 | 11/2005 | Sun | |
| 2006/0104508 A1* | 5/2006 | Daly et al. | 382/167 |
| 2007/0140334 A1* | 6/2007 | Sun | 375/240.03 |
| 2007/0183677 A1 | 8/2007 | Aguilar | |
| 2008/0253672 A1 | 10/2008 | Segall | |
| 2009/0003457 A1* | 1/2009 | Liu et al. | 375/240.25 |
| 2009/0046207 A1 | 2/2009 | Salvucci | |
| 2009/0097561 A1* | 4/2009 | Chiu et al. | 375/240.16 |
| 2009/0175338 A1 | 7/2009 | Segall | |
| 2009/0322800 A1 | 12/2009 | Atkins | |
| 2010/0080459 A1 | 4/2010 | Dai | |
| 2010/0172411 A1* | 7/2010 | Efremov et al. | 375/240.12 |
| 2010/0208809 A1 | 8/2010 | Yin | |
| 2010/0260260 A1 | 10/2010 | Wiegand | |

FOREIGN PATENT DOCUMENTS

| | | |
|---|---|---|
| WO | 2010/093432 | 8/2010 |
| WO | 2010/105036 | 9/2010 |
| WO | 2010/104624 | 10/2010 |
| WO | 2012/027405 | 3/2012 |
| WO | 2012/142471 | 10/2012 |

OTHER PUBLICATIONS

Mantiuk, R., et al., "Backward Compatible High Dynamic Range MPEG Video Compression,"ACM Transactions on Graphics, Jul. 2006.

Wachter, C. et al. "Instant Ray Tracing: The Bounding Interval Hierarchy" in Proceedings of the Eurographics Symposium on Rendering (2006) pp. 139-149.

Kay, T. et al "Ray Tracing Complex Scenes" Proceeding SIGGRAPH Computer Graphics, vol. 20, Issue 4, Aug. 1986, pp. 269-278.

Wald, I. et al "Ray Tracing Deformable Scenes Using Dynamic Bounding vol. Hierarchies" ACM Transactions on Graphics, vol. 26, Issue 1, Jan. 2007, Article No. 6.

Suzuki et al. "A Fast Ray-Tracing Using Bounding Spheres and Frustum Rays for Dynamic Scene Rendering" IEICE Transactions on Information and Systems, 2010, vol. E93D, No. 4, p. 891-902, 2010.

Chen, M. et al. "JPEG Compatible Coding of High Dynamic Range Imagery Using Tone Mapping and Vector Quantization", Picture Coding Symposium Apr. 2006.

Erdem A. T et al. "Compression of 10-Bit Video Using the Tools of MPEG-2" Signal Processing, Image Communication, vol. 7, No. 1, Mar. 1, 1995, pp. 27-56.

Motra, A et al. "An Adaptive LogLuv Transform for High Dynamic Range Video Compression" 2010 17th IEEE International Conference on Image Processing, Sep. 2010, pp. 2061-2064.

Paez, M.D. et al. "Minimum Mean-Square-Error Quantization in Speech PCM and DPCM Systems." IEEE Trans. on Comm. pp. 225-230, Apr. 1972.

\* cited by examiner

NON-LINEAR VDR RESIDUAL QUANTIZER

CROSS-REFERENCE TO RELATED APPLICATIONS

This application claims priority to U.S. Provisional Patent Application No. 61/478,836 filed 25 Apr. 2011, which is incorporated herein by reference in its entirety.

TECHNICAL FIELD OF THE INVENTION

The present invention relates generally to images. More particularly, an embodiment of the present invention relates to the non-linear quantization and de-quantization of the residual signal in layered coding of high dynamic range images.

BACKGROUND OF THE INVENTION

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured VDR version may involve applying a tone mapping operator (TMO) to intensity (e.g., luminance, luma) related pixel values in the HDR content. In a second approach, as described in International Patent Application No. PCT/US2011/048861 filed 23 Aug. 2011, herein incorporated by reference for all purposes, generating an SDR image may involve applying an invertible operator (or predictor) on the VDR data. To conserve bandwidth or for other considerations, transmission of the actual captured VDR content may not be a best approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to originally captured HDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays In such layered VDR coding, the residual bit stream may require more than the traditional 8-bits per color pixel for adequate representation. Without any preprocessing, direct coding of a VDR residual using a traditional SDR compressor, such as those described by the MPEG coding standards, may cause severe picture artifacts, such as blockiness and banding. It is the purpose of this invention to provide novel methods for the efficient pre-processing and coding of the residual in VDR layered coding.

In one embodiment of this invention, the residual is pre-processed by a non-linear quantizer before being coded. Such companding (or compansion) of the residual VDR signal allows a subsequent encoder to operate more efficiently and reduces coding artifacts.

In one embodiment of this invention, the residual quantizer is based on a mu-law and A-law non-linear quantizers. In a second embodiment of this invention, the residual quantizer is based on a generic, sigmoid function. In a third embodiment of this invention the residual quantizer is based on a transfer function based on the Laplacian cumulative distribution function. An example implementation of a method to jointly modify parameters of both the residual non-linear quantizer and the subsequent residual encoder is also presented.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Given a pair of corresponding VDR and SDR images, such as images that represent the same scene, each at different levels of dynamic range, improved coding of the residual signal in layered VDR coding is achieved. The VDR image is coded by combining a base layer (e.g., the SDR image) and a residual as an enhancement layer. In an embodiment, the enhancement layer comprises a difference between the original VDR image and a version thereof that is predicted, e.g., from the base layer. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the layered coding of images with high dynamic range. An embodiment applies a non-linear, sigmoid-based, quantizer to the residual VDR image, thus yielding advantageous coding efficiency and improved overall video quality.

Example VDR-SDR System

Figure 1:
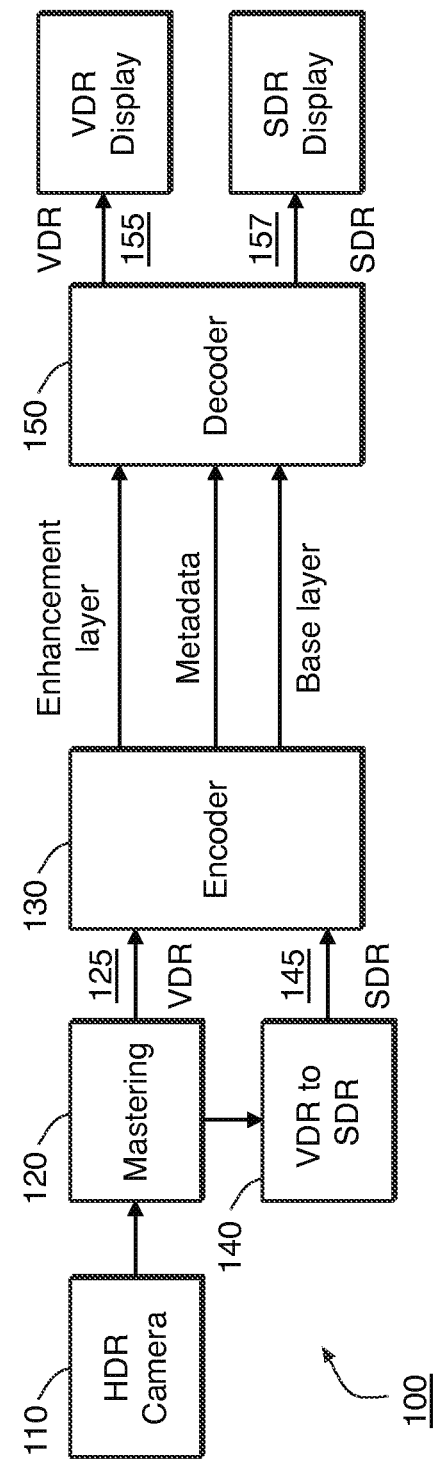
FIG. 1 depicts an example data flow for a VDR-SDR system, according to an embodiment of the present invention.

FIG. 1 depicts an example data flow in a VDR-SDR system 100, according to an embodiment of the present invention. An HDR image or video sequence is captured using HDR camera 110. Following capture, the captured image or video is processed by a mastering process to create a target VDR image 125. The mastering process may incorporate a variety of processing steps, such as: editing, primary and secondary color correction, color transformation, and noise filtering. The VDR output 125 of this process represents the director's intend on how the captured image will be displayed on a target VDR display.

The mastering process may also output a corresponding SDR image 145, representing the director's intend on how the captured image will be displayed on a legacy SDR display. The SDR output 145 may be provided directly from mastering circuit 120 or it may be generated by a separate VDR-to-SDR converter 140.

In an example embodiment, the VDR 125 and SDR 145 signals are input into an encoder 130. Encoder 130 creates a coded bitstream, which that reduces the bandwidth required to transmit the VDR and SDR signals. Moreover, encoder 130 functions to an encode a signal that allows a corresponding decoder 150 to decode and render either the SDR or VDR signal components. In an example implementation, encoder 130 may be a layered encoder, such as one of those defined by the MPEG-2 and H.264 coding standards, which represents its output as a base layer, an optional enhancement layer, and metadata. As defined herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or other predictor and quantizer operators, such as those described herein.

On the receiver, decoder 150 uses the received coded bitstreams and metadata to render either an SDR image or a VDR image, according to the capabilities of the target display. For example, an SDR display may use only the base layer and the metadata to render an SDR image. In contrast, a VDR display may use information from all input layers and the metadata to render a VDR signal.

Figure 2:
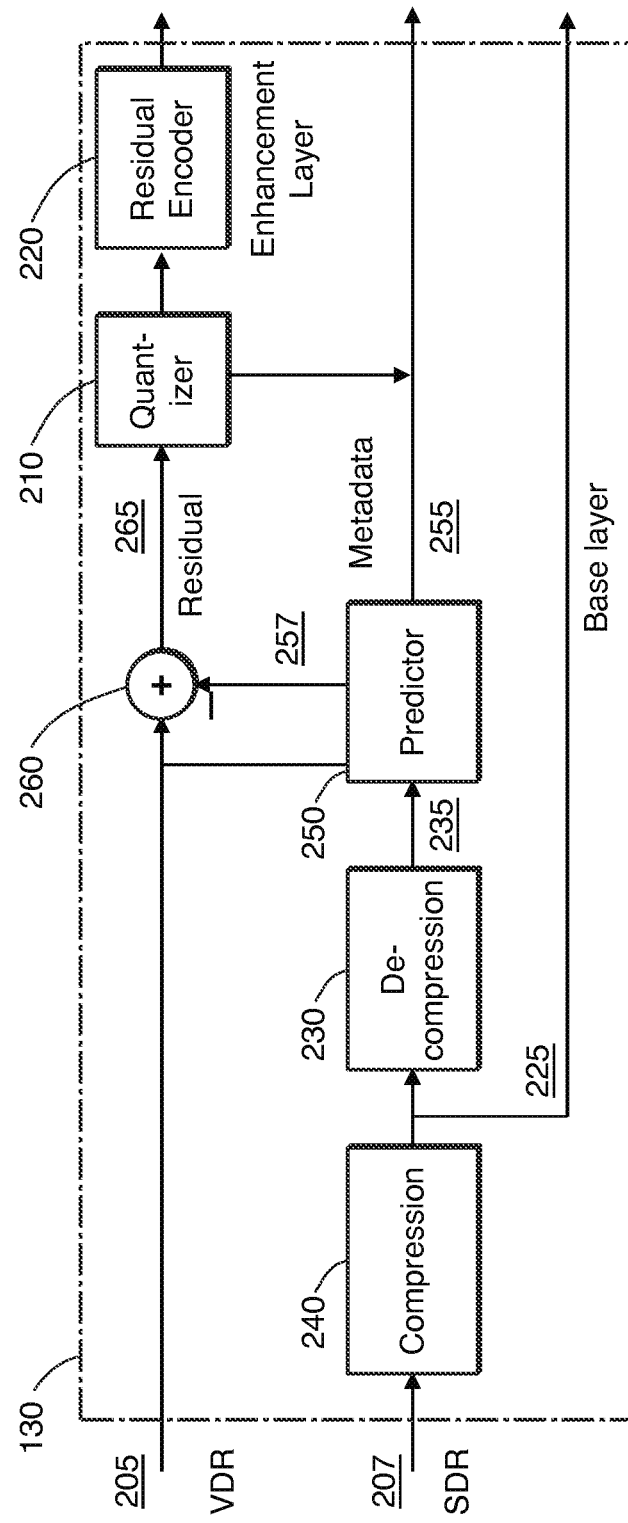
FIG. 2 depicts an example layered VDR encoding system according to an embodiment of the present invention.

FIG. 2 depicts an example implementation of encoder 130 incorporating the methods of this invention. In FIG. 2, SDR input 207 is typically 8-bit, 4:2:0, ITU Rec. 709 data; however the methods of this embodiment apply to other SDR representations as well. For example, some implementations may use an enhanced SDR input, SDR', which may have the same color space (primaries and white point) as SDR, but may use high precision, say 12-bits per pixel, with all color components at full spatial resolution (e.g., 4:4:4 RGB). The SDR input 207 is applied to compression system 240. Depending on the application, compression system 240 can be either lossy, such as according to the H.264 or MPEG-2 standards, or lossless. The output of the compression system 240 may be transmitted as a base layer 225. To reduce drift between the encoded and decoded signals, encoder 130 may follow compression process 240 with a corresponding decompression process 230. Signal 235 represents the SDR input as it will be received by a decoder. Predictor 250, as described for example in International Patent Application No. PCT/US2012/033605 filed 13 Apr. 2012, using input VDR 205 and SDR 235 data will create signal 257 which represents an approximation or estimate of input VDR 205. Adder 260, subtracts the predicted VDR 257 from the original VDR 205 to form output residual signal 265. Residual 265 may also be coded by another lossy or lossless encoder 220, such as those defined by the MPEG standards, and may be multiplexed in the output bit stream and transmitted to the decoder as an enhancement layer.

Predictor 250 may also provide the prediction parameters being used in the prediction process as metadata 255. Since prediction parameters may change during the encoding process, for example, on a frame by frame basis, or on a scene by scene basis, these metadata may be transmitted to the decoder as part of the data that also include the base layer and the enhancement layer.

Residual 265 represents the difference between two VDR signals, thus it is expected to be represented by more than 8-bits per color component. In many possible implementations, encoder 220 may not be able to support the full dynamic range of this residual signal. In an example implementation, the residual may be 16 bits and the residual encoder 220 may be a standard H.264, 8-bit, encoder. In order for encoder 220 to accommodate the dynamic range of residual 265, quantizer 210 quantizes residual 265 from its original bit-depth representation (say 12 or 16 bits) to a lower bit-depth representation. The quantizer parameters may also be multiplexed into the metadata bitstream 255.

In one possible implementation, one may pre-process residual 265 by a linear quantizer. Such coding is possible; however, since in most cases the distribution of output values in the residual 265 is not uniform, one may experience severe coding artifacts, such as blockiness and banding.

Figure 4:
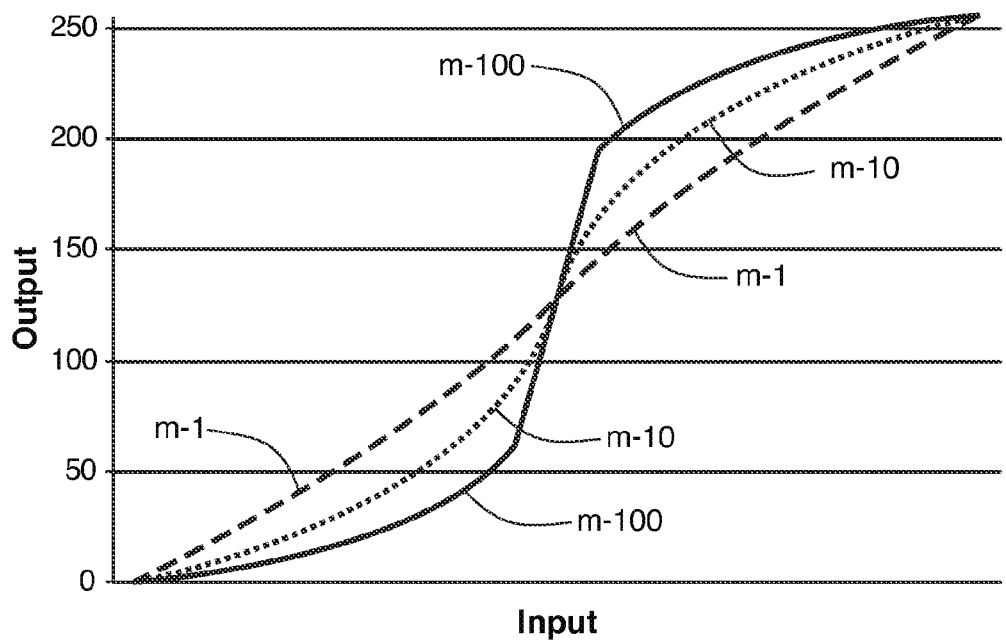
FIG. 4 depicts an example of a non-linear quantization transfer function according to embodiments of the present invention.

In an example embodiment of this invention, a novel non-linear quantizer based on the characteristics of sigmoid transfer functions, such as the mu-law ($\mu$-law) transfer function, is described As used herein, the term "sigmoid function" relates to a non-linear function with an "S-like" shape and relatively linear response in its middle range. FIG. 4 depicts examples of such transfer functions.

Figure 3:
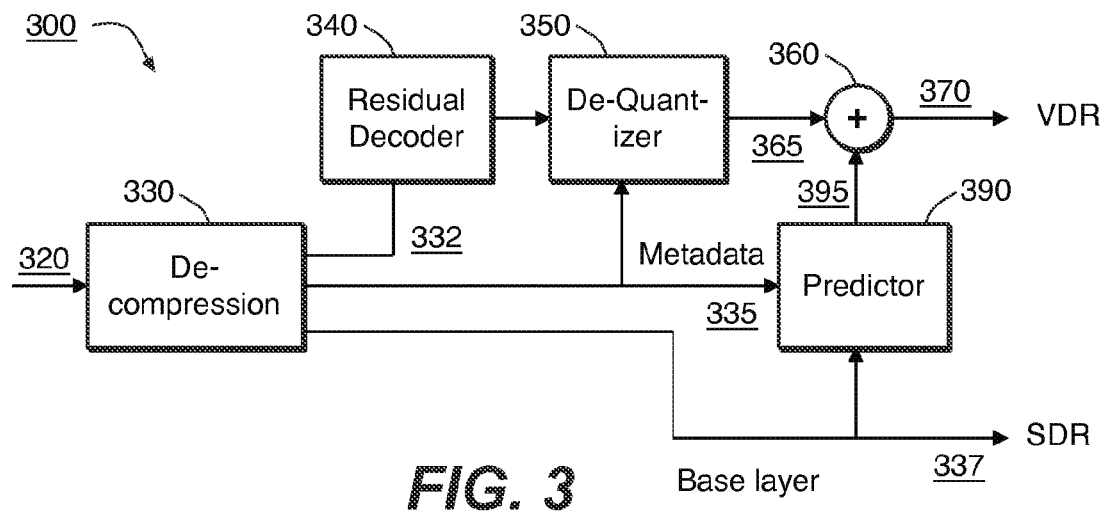
FIG. 3 depicts an example layered VDR decoding systems according to an embodiment of the present invention.

FIG. 3 depicts in more detail an example implementation of decoder 150. Decoding system 300 receives a coded bitstream that may combine a base layer 337, an enhancement layer (or residual) 332, and metadata 335, which are extracted following decompression 330. For example, in a VDR-SDR system, the base layer 337 may represent the SDR representation of the coded signal and the metadata 335 may include information related the prediction (250) and quantization (210) steps used in the encoder. Residual 332 is decoded (340), de-quantized (350), and added to the output 395 of the predictor 390 to generate the output VDR signal 370. In an example embodiment of this invention, novel, non-linear de-quantizers based on the characteristics of sigmoid transfer functions, such as the mu-law ($\mu$-law) transfer function, are described.

Residual Quantization

The purpose of the residual quantizer 210 is to limit the dynamic range (bit-depth) of the residual VDR signal 265 before being encoded by a residual encoder (or compressor 220), such as an H.264 encoder. There are compression schemes, such as the H.264 compression standard, which may accommodate inputs at higher bit-depths than 8; however, most commercially available, hardware-based, encoders and decoders do not support this feature. It is one purpose of this invention to implement VDR coding using currently commercially available SDR-based codecs.

One approach to quantize residual 265 is to apply a uniform (linear) quantizer. However, one may observe that the distribution of the VDR residual does not follow a uniform distribution and often shows a Gaussian-like, non-uniform distribution. Furthermore, when using a uniform quantizer, reconstructed VDR images usually contain blocking artifacts.

One method to overcome these limitations of uniform quantizers is to use a non-uniform quantizer, such as a Lloyd-Max optimal quantizer. Such a quantizer may be optimal, provided one has prior knowledge of the probability distribution function (PDF) of the input signal. However, as the distribution of the residual may change from frame to frame, such a solution may imply a higher overhead cost when transmitting the quantizer metadata. Such a quantizer, based on a Laplacian PDF, is presented herein in one example implementation.

Another method is to use a compander such as those defined by sigmoid functions, such as the mu-law or A-law functions. Such companders have been used with great success for the coding and transmission of speech and audio signals; however, to the best of our knowledge, no such methods have been applied to the quantization of residual VDR signals. Such quantizers are also presented herein in alternative example embodiments of this invention.

As defined herein, the $\mu$-law and A-law forward and inverse transfer functions are described as:

Mu-Law $$y = c(x) = x_{max} \frac{\ln\left(1 + \mu \frac{|x|}{x_{max}}\right)}{\ln(1 + \mu)} \mathrm{sign}(x), \quad (1)$$

$$c^{-1}(y) = \frac{x_{max}}{\mu}\left[(1+\mu)^{\frac{|y|}{x_{max}}} - 1\right]\mathrm{sign}(y). \quad (2)$$

where $x_{max}$ denotes the maximum absolute value of the input signal.

A-Law $$y = c(x) = \begin{cases} \frac{A|x|}{1 + \ln A}\mathrm{sign}(x) & 0 \le \frac{|x|}{x_{max}} \le \frac{1}{A} \\ x_{max}\frac{1 + \ln\frac{A|x|}{x_{max}}}{1 + \ln A}\mathrm{sign}(x) & \frac{1}{A} \le \frac{|x|}{x_{max}} \le 1 \end{cases} \quad (3)$$

$$c^{-1}(y) = \begin{cases} \frac{|y|}{A}(1 + \ln A)\mathrm{sign}(y) & 0 \le \frac{|y|}{x_{max}} \le \frac{1}{1 + \ln A} \\ \frac{x_{max}}{A}\exp\left[\frac{|x|}{x_{max}}(1 + \ln A) - 1\right]\mathrm{sign}(y) & \frac{1}{1 + \ln A} \le \frac{|y|}{x_{max}} \le 1. \end{cases} \quad (4)$$

From equations (1) and (3), the original mu-law and A-law functions can be defined using only the mu ($\mu$), $x_{max}$, and A parameters. While typically the input to the residual encoder 220 will range between 0 and 255 (representing the range for 8-bit numbers), it may be desirable from a coding efficiency point of view to restrict even further this range. Lets denote as $L_{max}$ half of the desired maximum dynamic range of the output of the residual quantizer, and denote as O a positive offset so that output of the quantizer is always positive, then an example implementation of a mu-law-based VDR residual quantizer can be defined as $$c(x) = O + L_{max} \frac{\ln\left(1 + \mu \frac{|x|}{x_{max}}\right)}{\ln(1 + \mu)} \text{sign}(x), \tag{5}$$

$$c^{-1}(y) = \frac{x_{max}}{\mu}\left[(1+\mu)^{\frac{|y-O|}{L_{max}}} - 1\right]\text{sign}(y - O). \tag{6}$$

Similar functions can be derived for an A-law-based VDR residual quantizer as well.

FIG. 4 shows an example set of plots of c(x) in equation (5) for a normalized input x in the range between −1 and 1 ($x_{max}$=1), O=128, $L_{max}$=128, and mu values of 1 (m-1), 10 (m-10), and 100 (m-100). In practice, c(x) in equation (5) may be followed by a ceiling function or any other rounding function, so its output is always an integer. Similarly, to compensate for the rounding errors, in equation (6), instead of using |y−O|, one may use |y−O|−0.5. The value of O depends on the bit-depth of the output of the quantizer.

From FIG. 4, one may note that equation (5) resembles a sigmoid function where mu controls the slope of the function for its midrange input values. For large values of mu, c(x) is almost linear in the midrange.

While c(x) in equation (5) is expressed only in terms of four parameters, the same equation can easily be expressed in alternative parametric implementations, such as a piecewise linear function, or higher-order non-linear functions. The transfer function can also be implemented using look-up tables. Furthermore, since a video signal has typically three or more color components, for example YUV, YCbCr, or RGB, the residual quantizer needs to be optimized for each color component. Thus, in an example implementation, using the mu-law VDR quantizer of equation (5), quantizer 210 needs to pass to the decoder up to four sets of O, μ, $x_{max}$, and $L_{max}$ parameters, one set for each one of the color components of the residual.

In an another example implementation, the non-linear quantizer transfer function may also be described by a more generic sigmoid function, such as:

$$c(x) = O + L_{max} \frac{|x|}{x_{max}\sigma + |x|} \text{sign}(x), \tag{7}$$

and $$c^{-1}(y) = \left[\frac{\sigma x_{max}}{\frac{L_{max}}{(y-O)} - 1}\right]\text{sign}(y - O), \tag{8}$$

where like mu in equation (5), σ (sigma) controls the midrange slope of the function and $x_{max}$, O, and $L_{max}$ are defined as before. For example, in an example implementation, a set of parameters is: $x_{max}$=1, O=128, $L_{max}$=128, and σ=0.1

The non-linear quantizer can also be designed by modeling the distribution of the residual signal by certain random distributions such as Laplacian, Exponential, Gamma distribution, Gaussian, Cauchy, or the like. In another example implementation, an optimum quantizer is designed by modeling the residual signal using the Laplacian distribution:

$$p(x) = \frac{1}{2\alpha} e^{-\frac{|x-\mu|}{\alpha}}, \tag{9}$$

where μ is the mean of the residual signal and $$\sigma = \sqrt{2}\alpha \tag{10}$$

is the standard deviation. Given N samples from the residual signal, α can be estimated as:

$$\hat{\alpha}^2 = \frac{1}{2N}\sum_{i=1}^{N}|x_i - \hat{\mu}|^2, \tag{11}$$

where $\hat{\mu}$ denotes an estimate of the mean value.

Given the Laplacian PDF of equation (9), one can derive the corresponding cumulative distribution function (CDF) as $$c(x) = 0.5\left[1 + \text{sign}(x-\mu)(1 - e^{\left(\frac{-|x-\mu|}{\alpha}\right)})\right]. \tag{12}$$

Function c(x) in Equation (12) has also a sigmoid representation, and α can be used to control the slope of its middle-section. As described earlier, the values of equation (12) can also be scaled and offset to accommodate the input requirements of the residual codec following the non-linear equalizer.

In an example implementation of a Laplacian CDF-based non-linear quantizer, given the length L of a quantization table, one may use equations (9-12) and non-linear quantizer optimization techniques to derive thresholds that control how input values are mapped to output quantized values. For example, in one possible implementation, one may use a minimum mean-square error optimization criterion and optimization techniques such as those described by M. D. Paez and T. H. Glisson in "Minimum Mean-Square-Error Quantization in Speech PCM and DPCM Systems", IEEE Trans. On Comm, v.COM-20, n.2, pp. 225-230, April 1972.

In an example implementation, these quantization thresholds may be designed only once under the assumption that μ=0 and σ=1, and can be known by both the encoder and the decoder. However, since input residual data may have different values for μ and σ, the encoder may adjust these thresholds as needed. The encoder may pass the estimated μ and σ values to the decoder so it can adjust the corresponding dequantizer accordingly.

Example Process for Non-Linear Vdr Residual Quantizer

Figure 5A:
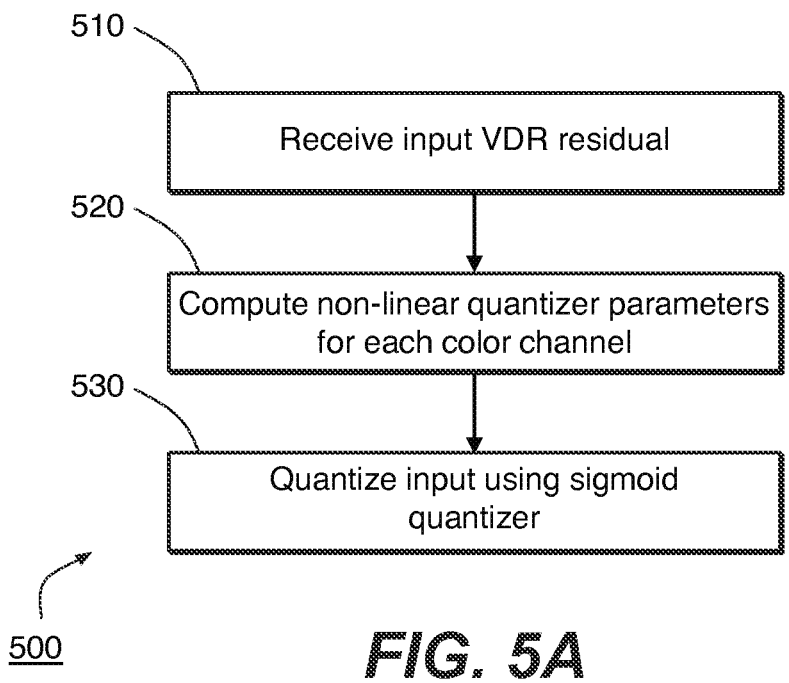
FIG. 5A depicts an example non-linear quantization process according to one embodiment of the present invention.

FIG. 5A shows an example process for a non-linear-based VDR residual quantization according to an example implementation of our invention.

The process starts at step 510, wherein a quantizer, such as quantizer 210, receives the residual image between a VDR signal and its predicted value. In step 520, process 500 computes the parameters needed for an accurate representation of the quantizer function of equation (5). Such parameters include O, which may be fixed for the whole video sequence, and $L_{max}$, μ, and $x_{max}$ which may be computed separately for each color component and for each frame or a group of frames. Finally, in step 530, the residual VDR signal is quantized. The quantizer parameters can be sent to the decoder as part of a metadata bitstream.

Residual quantization process 500 can be repeated at a variety of time intervals as deemed necessary to maintain coding efficiency while using available computing resources. For example, when coding video signals, process 500 can be repeated on a per predefined video slice size basis, for each frame, a group of frames, or any other appropriate criterion.

Figure 5B:
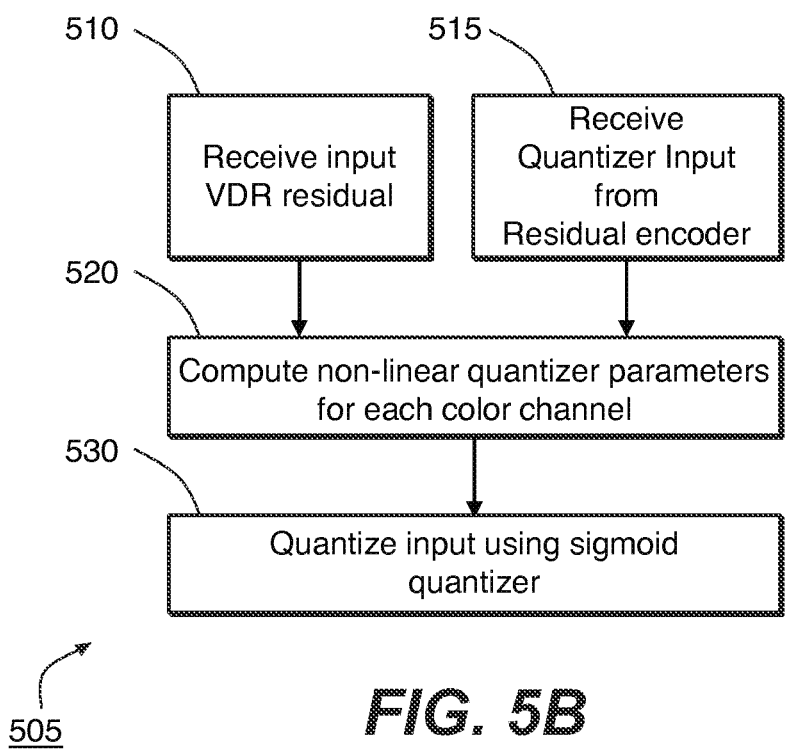
FIG. 5B depicts an example non-linear quantization process according to a second embodiment of this invention.

In many possible implementations it is advantageous that encoder 130 adjusts jointly the quantization parameters in the non-linear quantizer 210 and the residual encoder 220. One example implementation is shown in FIG. 5B, where step 520 receives now two set of inputs: the VDR residual 510 and quantizer input from the residual encoder 220. In one example implementation, the quantizer input 515 may be the average of the block quantization parameters in a frame. In another possible implementation, input 515 may also consist of the maximum, minimum, or other combination of quantizer values being used by residual encoder 220.

Input 515 may be used to adjust any of the parameters in the non-linear equalizer transfer function. In one embodiment, given the desired output bitstream size and the average of the block quantization parameters in a frame (say $QP_{avg}$) one may adjust the maximum output value of the non-linear equalizer ($L_{max}$ in equations (5) and (7)) for a subsequent frame as follows:

---
$L_{max} = L_{max\_ini}$ // Set $L_{max}$ to an initial value
Use the non-linear quantization parameters to quantize an input frame and compress it using residual encoder;
Read $QP_{avg}$ from Residual Encoder;
If ($QP_{avg} >$ threshold1)
   then lower( $L_{max}$)
If ($QP_{avg} <$ threshold2)
then increase( $L_{max}$)

---

The algorithm above takes into consideration that when $QP_{avg}$ is too high, the residual encoder is probably working too hard to satisfy the bitstream size constraint and it may improve compression efficiency if $L_{max}$ is lowered. Similarly, when $QP_{avg}$ is too low, the residual encoder is not using the allocated bistream size efficiently and its compression efficiency may improve if $L_{max}$ is increased.

VDR Residual Decoding

Embodiments of the present invention may be implemented either on an image encoder or an image decoder. FIG. 3 shows an example implementation of decoder 150 according to an embodiment of this invention. Given the residual quantization parameters, which in an example implementation may be extracted from metadata 335, residual de-quantizer 350 can perform a non-linear-based VDR de-quantization; for example using equations (6) or (8) or by using look-up tables. As explained earlier, the de-quantized residual can be added to predictor output 395 to reconstruct the original VDR signal.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to residual quantization, such as those described herein. The computer and/or IC may compute, any of a variety of parameters or values that relate to the non-linear residual quantization as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement non-linear-based residual quantization methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to applying non-linear-based residual quantization in coding VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for the coding of High Dynamic Range (HDR) images, the method comprising:

accessing an input HDR image and an input Standard Dynamic Range (SDR) image, wherein the input HDR and SDR images represent the same scene but at a different dynamic range;

generating a predicted HDR image based on the input SDR image and the input HDR image;

generating a residual HDR input image based on the input HDR image and the predicted HDR image;

for limiting the dynamic range of the residual HDR input image, applying a non-linear quantization to the residual HDR input image to output a quantized residual image; and coding the quantized residual image using a residual encoder, wherein said residual HDR input image has a bit-depth that is higher than the bit-depth supported by the residual encoder, wherein the method step of non-linear quantization comprises:

transforming pixel values of the residual HDR input image to corresponding quantized pixel values according to a non-linear transfer function; said transfer function characterized by one or more function parameters, said function parameters comprising an offset parameter and an output dynamic range parameter representative for a desired maximum dynamic range of the non-linear quantization;

wherein said transfer function has a mid-range slope controlled by one or more of the function parameters, and wherein said parameters of the non-linear transfer function are set by a method comprising:

receiving from the residual encoder quantizer information related to one or more of the function parameters, the offset parameter, and the output dynamic range parameter; and adjusting said one or more parameters based on said received quantizer information, wherein the non-linear transfer function comprises computing $$c(x) = O + L_{max} \frac{|x|}{x_{max}\sigma + |x|} \text{sign}(x),$$

wherein O denotes the offset parameter, $L_{max}$ denotes the output, dynamic range parameter, x is a residual HDR input pixel value, c(x) is the quantized output value, $x_{max}$ is the maximum absolute value of the residual HDR input pixel values, and σ denotes a function parameter controlling the mid-range slope.

2. The method of claim 1 wherein the residual HDR image has a bit-depth of 12 bits or 16 bits and the residual encoder supports input signals with a bit-depth of 8 bits.

3. The method of claim 1 wherein the offset parameter comprises a value that is equal to 128.

4. The method of claim 1 wherein the output dynamic range parameter comprises a value that is between 0 and 128.

5. The method of claim 1, wherein said output dynamic range parameter is determined by:
(a) setting the output dynamic range parameter to an initial value;
(b) applying current values of said parameters to the non-linear transfer function to quantize input residual HDR data;
(c) computing an average of block quantization parameter values for a frame applied to the input residual data by the residual encoder; and
(d) lowering a current value of the output dynamic range parameter if said computed average is higher than a first threshold value respectively increasing the current value of the output dynamic range parameter if said computed average is lower than a second threshold value.

6. The method of claim 1, wherein the parameters of the non-linear transfer function are signaled to a decoder as metadata.

7. The method of claim 1, wherein the residual encoder is an MPEG encoder.

8. An apparatus comprising a processor and configured to perform the method recited in claim 1.

9. A non-transitory computer-readable storage medium having stored thereon computer-executable instruction for executing a method using a processor in accordance with claim 1.

10. A method for the coding of High Dynamic Range (HDR) images, the method comprising:

accessing an input HDR image and an input Standard Dynamic Range (SDR) image, wherein the input HDR and SDR images represent the same scene but at a different dynamic range;

generating a predicted HDR image based on the input SDR image and the input HDR image;

generating a residual HDR input image based on the input HDR image and the predicted HDR image;

applying a non-linear quantization function to the residual HDR input image to output a quantized residual image; and coding the quantized residual image using a residual encoder, wherein applying the non-linear quantization function comprises computing:

$$c(x) = O + L_{max} \frac{\ln\left(1 + \mu \frac{|x|}{x_{max}}\right)}{\ln(1 + \mu)} \text{sign}(x),$$

wherein O denotes an offset parameter, $L_{max}$ denotes an output dynamic range parameter, x is a residual HDR input pixel value, c(x) is the quantized output value, $x_{max}$ is the maximum absolute value of the residual HDR input pixel values, and mu (μ) denotes a function parameter.

* * * * *